Dec. 10, 1946.  W. M. SCHNEIDER  2,412,292
PHOTOGRAPHIC CONTROL MEANS
Filed April 13, 1943  3 Sheets-Sheet 1
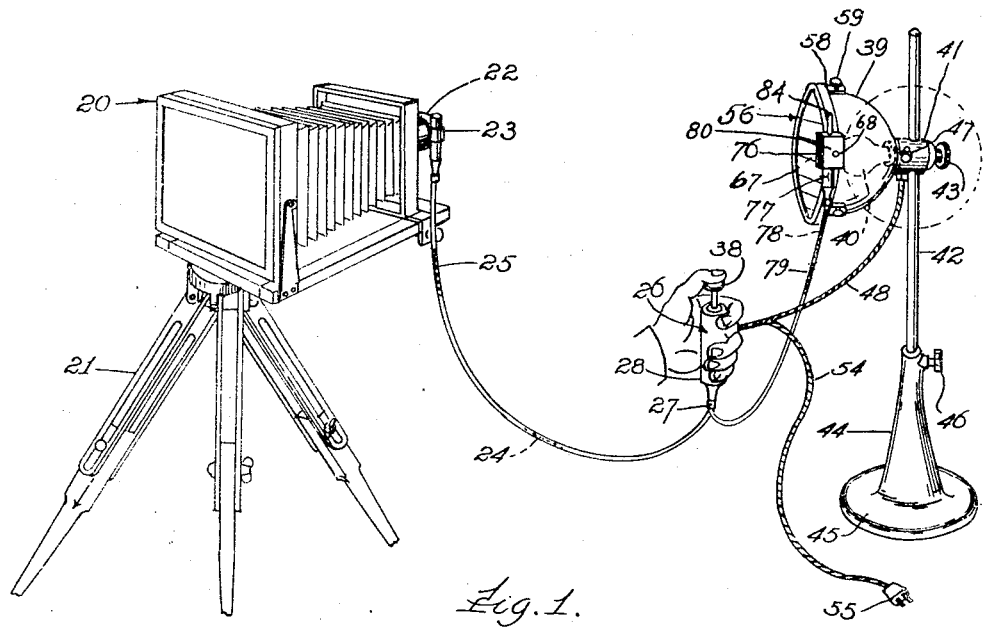
Fig. 1.
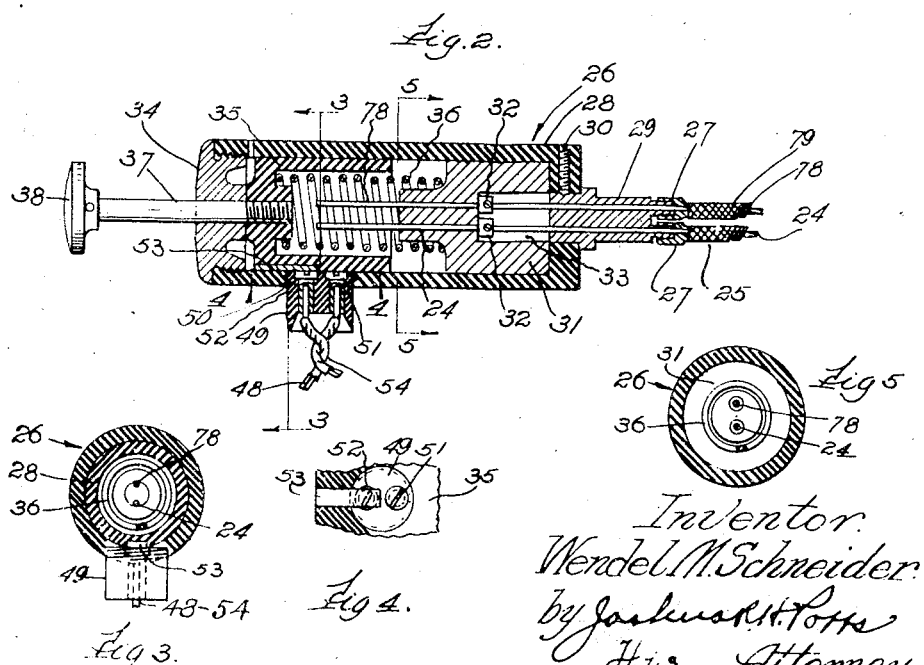
Fig. 2.
Fig. 3.  Fig. 4.  Fig. 5.
Inventor
Wendel M. Schneider
by Joshua R. H. Potts
His Attorney.

Dec. 10, 1946.  W. M. SCHNEIDER  2,412,292
PHOTOGRAPHIC CONTROL MEANS
Filed April 13, 1943  3 Sheets-Sheet 2
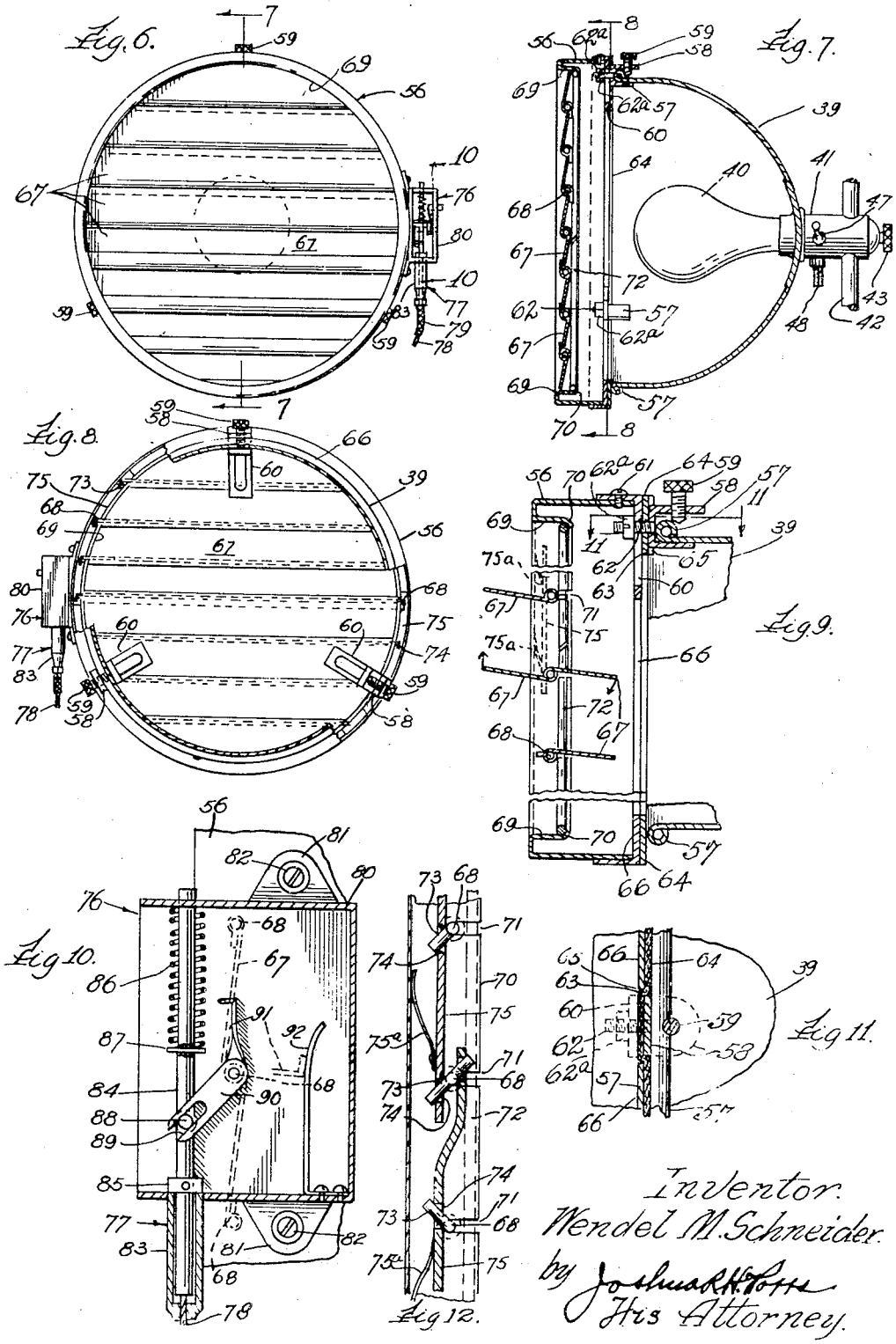
Inventor:
Wendel M. Schneider
by Joshua R. H. Potts
His Attorney.

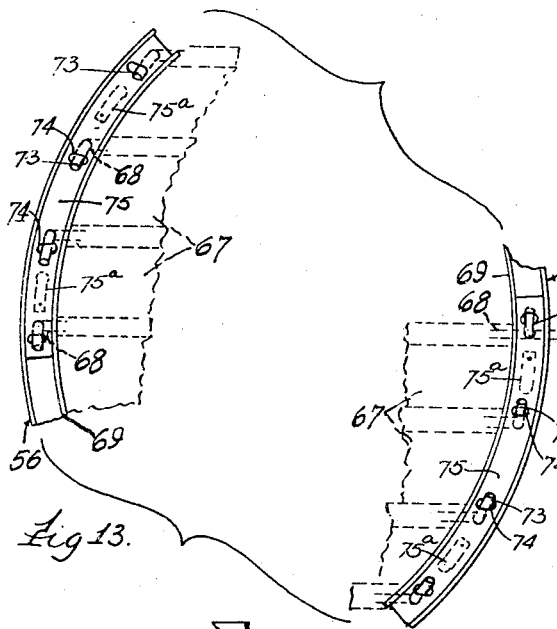
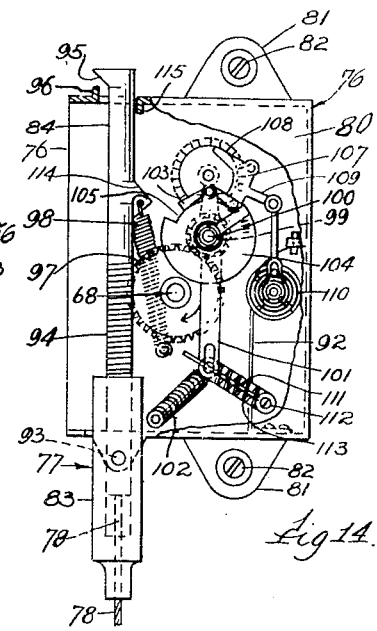
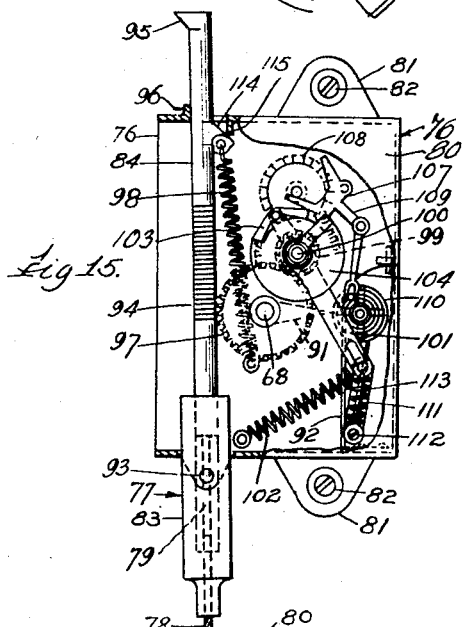
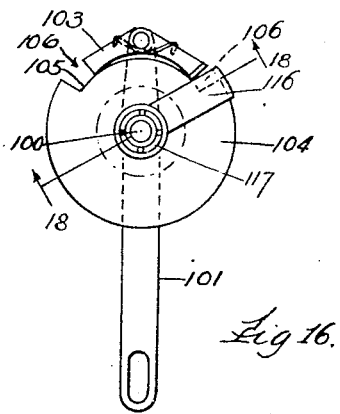
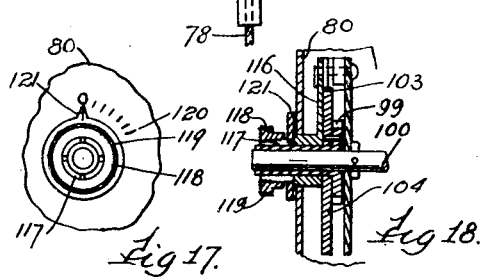

Patented Dec. 10, 1946

2,412,292

UNITED STATES PATENT OFFICE 2,412,292

PHOTOGRAPHIC CONTROL MEANS

Wendel M. Schneider, Chicago, Ill.

Application April 13, 1943, Serial No. 482,912

13 Claims. (Cl. 240—2)

1

My invention relates to photography or photographic control means, especially photographing means for taking photo-flash and time pictures with artificial light in the dark or at night time, and more particularly for using a flood light and a bulb in lieu of a flash light as produced by a flash-light bulb or what is sometimes known as a photo-flash lamp, and in properly and accurately controlling the camera exposure shutter and flood light as well as the projection of the light rays therefrom, so that a flood light may be used in taking both photo-flash shots or snapshots or flash pictures and flood-light pictures from time exposures, using artificial light in the dark such as at night, to give most efficient and best results with greater economy as compared to the use of flash-light bulbs for taking photo-flash or snapshots, since a flash-light bulb can only be used for taking a single exposure or picture whereas a flood-light bulb can be used over and over many times.

Heretofore, in taking photo-flash or snapshots, or candid pictures in the dark or night time with artificial light, it was customary to use flash-light bulbs or photo-flash lamps with a fast-registering sensitive photographic film and a quick-acting lense exposure shutter, and in taking time-exposure pictures, to use a suitable form of high-powered arc or flood lamp or bulb, both with reflectors to reflect or throw the intensive light rays on the object. However, as is well known, flash-light bulbs are expensive and are only used once, while flood-light bulbs last for some time, especially if used economically, though their useful life is shortened by improper use, as by lighting them when not actually taking a picture, as in posing and arranging sittings.

The object of the present invention is to provide a novel photographic control means or means for using a flood lamp for more economically taking snapshots or flash pictures as well as time-exposure pictures and for controlling the use of light rays of a flood lamp for both photo-flash shots and time exposures, so that either may be taken with greater economy than heretofore. These objects are attained by providing a reflector using a photo-flood lamp or bulb for producing the required artificial light and in equipping the reflector with means such as shutters capable of being quickly opened and closed, in addition to the control of the lamp itself to give a flash of light on the object for snapshots, or to give time exposures, that is, to open the shutters so that the light rays may be projected from the source to the object, and to control or delay the closing or shutting of the same, with efficient picture-taking results, the same as in using a flash-light bulb as well as for time exposure pictures in the dark or at night.

Another object is to provide a novel and simple

2 shutter mechanism for reflectors adapted to use flood-light bulbs or lamps, and a novel system or method and means for controlling the operation of a camera-shutter with or without a timer, and the time interval between opening and closing of the shutters for the flood light, whether for instantaneous or delayed closing, or what is commonly known as bulb or cable control, and timer control for time exposures, as well as the timed relation, which may be simultaneous or synchronous, variable or successive in operation, switching or turning on and off the flood light or current thereto, as well as the opening and closing of the shutters in the front of the flood light reflector, so that the same may be used for snap or time exposures and adjusted as desired.

Another object of the invention is to control the camera exposure shutter, the flood light lamp and the shutters for shutting off or obstructing the projection thereof, from a single hand-operated means which includes a switch and cable-operating means for a camera shutter and the reflector shutters, which is capable of adjustment to vary the relation of operation thereof by imparting translatory movement to the cables and for normal return to a position in which the shutters are closed and the light extinguished automatically or by manual release, or by which timing mechanism for releasing the shutters to permit the same to close may also be controlled.

Another object of the invention is to provide a novel construction of shutters and mounting means therefor, for application to reflectors, as used in connection with flash or flood lights in photography, and for applying the same to reflectors of different sizes.

Further objects and advantages will appear and be brought out more fully in the following specification, reference being had to the accompanying drawings, in which:

Fig. 1 is a perspective view showing my improved photographic control means and reflector shutters as applied to a camera and flood light, the flood light being turned away from the object to better show the structure thereof.

Fig. 2 is an enlarged central longitudinal sectional view showing the hand control means for the camera and reflector shutter cables and light-control switch.

Fig. 3 is a cross-sectional view taken on the line 3—3 of Fig. 2.

Fig. 4 is a fragmentary longitudinal view taken on the line 4—4 of Fig. 2.

Fig. 5 is a transverse sectional view taken on the line 5—5 of Fig. 2.

Fig. 6 is an enlarged front elevation of the flood-light reflector and shutters mounted thereon, together with the shutter-operating means.

Fig. 7 is a diametrical sectional view taken on the line 7—7 of Fig. 6.

Fig. 8 is a rear elevation, partly broken away and in section, of the shutter mechanism of the flood light reflector, taken on the line 8—8 of Fig. 7.

Fig. 9 is an enlarged fragmentary sectional view similar to Fig. 7.

Fig. 10 is an enlarged sectional view taken on the line 10—10 of Fig. 6, to show the operating means for the reflector shutters.

Fig. 11 is a fragmentary sectional view taken on the line 11—11 of Fig. 9.

Fig. 12 is an enlarged fragmentary sectional view showing the manner of mounting and operating the shutters.

Fig. 13 is an enlarged fragmentary elevation corresponding to Fig. 8 and showing the means for simultaneously operating the shutters of the reflector.

Fig. 14 is a sectional elevation corresponding to Fig. 10, but showing a timing mechanism for controlling the closing of the shutters of the reflector or flood light when said shutters are closed.

Fig. 15 is a view similar to Fig. 14 but showing the positions of the parts when the shutters are open.

Fig. 16 is an enlarged fragmentary view showing the compensating or time-delay means used in connection with the shutter timer for regulating the closing of the shutters.

Fig. 17 is a fragmentary elevation showing the adjustment means for setting or changing the time of closing the reflector shutters or time duration of exposure, and Fig. 18 is an enlarged fragmentary sectional view taken on the line 18—18 of Fig. 16 of the time control.

Referring more particularly to the drawings in detail, in which like reference characters designate corresponding parts throughout the several views, 20 designates a camera which may be of any desired type, either for portraits, a folding camera or otherwise, and is shown mounted upon a tripod. The camera has a shutter or shutter mechanism 22 over the lens thereof, controlling the exposure of the film to the light in taking a picture, and this shutter mechanism 22 may be provided with the usual cable release or pneumatic cylinder and piston or bulb 23, with or without a timer or timing mechanism for regulating the time of exposure in the usual way. The shutter-operating device 23 is shown as being cable-operated, having a flexible spring wire, shaft or cable 24 operating in a flexible casing or sheath 25, anchored at its opposite ends in the usual manner, and the cable being connected to the shutter control or a plunger to open and close the shutter or to open the same, so that this closing is controlled by a timer such as the timer on the camera or a separate timer on the flood-light lamp to be later described. The opposite end of the cable and the corresponding end of the sheath extend to a plunger control means 26, the sheath being anchored thereto at one end, as indicated at 27, and the cable being adjustable in length as to its projection within a cylinder or tubular casing 28 preferably of insulating or dielectric material, such as by extending the cable through an extension plug 29 longitudinally adjustable in one end of the cylinder 28 as by means of a set screw 30. The cable also extends through a core 31, and its degree of projection at the inner end thereof may be regulated by a clamp 32 movable in a bore 33. The cylinder has a removable head or threaded cap plug 34, which is thereby adjustable, and a plunger or piston 35 is movable in the cylinder and held outward by an expansible coil spring 36 positioned between one end of the cylinder 28 or the core 31 therein and the plunger 35, which latter has a threaded or other removable stem 37 operating through the head 34 and provided with a finger-engaging piece 38 for moving the plunger against the spring, to shift the cable 24 for imparting translation thereto to actuate the camera shutter and to release the same for manual instantaneous return or control of its delayed automatic closing by a timer mechanism of the usual or any preferred type provided on cameras and capable of regulation for time exposures or automatic instantaneous closing for snapshots.

The cable 24 may be in the form of a rod or rigid within the cylinder at 23 or 28, and where it projects for engagement by the plunger or piston in cylinders 23 and 28 is held in its position by the control mechanism 23 or otherwise, as by timer control means.

Since the present photographic control means is primarily for taking pictures by artificial light, I provide a reflector 39 such as used for taking flash shots or time exposures with a light or floodlamp bulb such as indicated at 40, and this may be supported in any suitable way at the socket receiving stem 41, which may be adjustably arranged on a vertical post or upright standard 42, as by a set screw 43, and the standard may be vertically adjusted in the socket portion 44 of a base 45 as by a set screw 46, but any other suitable form of adjustable supporting means may be employed.

In Fig. 1 the reflector is turned away from the object to be photographed, at the proper distance in front of the camera, in order to show the structure of the reflector and shutter-control means for the light rays therefrom, designed to give an intensive light for pictures in the dark, whether snapshots or time exposures.

The lamp may have an independent switch 47 and in addition is connected to a two-wire cable, 48, adapted to be plugged into an insulated socket 49, threaded or otherwise mounted in one side of the cylinder 28, as indicated at 50, and the wires being connected to spaced or separate contacts 51 and 52, designed to be bridged by a movable contact 53 carried by the plunger 35 to close the circuit to the lamp of the flood light, receiving its current supply through a two-wire cable 54 constituting an extension of the cable 48 or vice versa, and having a plug 55 at the end for insertion into the socket of the house-wiring or other source of current supply. The manual plunger control means 26 is adapted to be held in one hand, as shown in Fig. 1, for actuating the plunger by the thumb or one finger at any suitable position relative to the camera and flood light.

In order to control the light rays emanating in the intensive light source or flood light bulb 40 and the projection of the direct and reflected rays therefrom and from the interior of the reflector 39, so as to project or obstruct same, suitable means is provided on the reflector, and this takes the form of a shutter mechanism which may be permanently or removably mounted thereon or adjusted to reflectors of different sizes. This shutter mechanism is adapted to permit the flood light, in lieu of an ordinary flash bulb, to be used for not only taking flash or snapshots, but also for taking time pictures, as is not possible by using flash-light bulbs, and is for the purpose of obtaining efficient results at less cost.

One form of shutter mechanism includes a circular frame or collar 56, adapted to be mounted on the rim 57 of the reflector 39, which may be of curved, spherical or parabolic shape, said rim being shown as beaded. The band or collar of the frame 56 may be fixedly mounted on the rim of the reflector, and, as shown, is provided with attaching or clamping means of any character and number, such as three, in the form shown, having U-shaped clamps 58, with spaced jaws fitting over or receiving the beaded rim 57 and held by clamping means such as set screws 59. These clamps are carried by the frame or collar at suitable intervals and may be adjusted to fit reflectors of different sizes. For this purpose, radially extending slotted arms 60 may be adjustably or otherwise attached to the frame, as indicated at 61, such as by means of an angle piece and a set screw with a slot, or otherwise.

The clamps 58 are adjustable in the slots of the arms 60, as by a hollow rivet and a threaded shank 62, and held by a nut 62a. If desired, suitable ventilation may be provided for the heat within the reflector, and as shown the intermediate bight portions of the clamps set in recesses formed by depressions 63 in a suitable gasket 64 of fiber or other suitable material and formed by projections entering slots 65 in a flange 66 of the frame 56 as seen in Figs. 7, 9 and 11. This construction holds the clamps 58 in position, but permits radial adjustment thereof to fit the rims of different sized reflectors and rigidly supports the frame in fixed position and against vibration, as well as closing the space between the frame and the rim of the reflector, to prevent the escape of light rays at such point.

Suitable shutter mechanism is provided in the frame, and this may take the form shown, in which a plurality of shutters or blades 67 have their pivot pins or axes 68 pivoted in the frame 56. For this purpose the frame may have an inturned right angular flange 69, turned radially and then parallel to the frame, with a rolled or turned edge 70, with bearing slots 71 projecting in from the edge thereof to receive the ends of the pivot pins or shafts 68 forming the axes of the shutter blades and held by a split expansion ring 72 or other suitable means provided for the purpose, to retain the shafts and shutters in position to freely turn.

The ends of the shafts are provided with angular or crank portions 73 having arms adapted to engage slots 74 in arcuate strips or connectors 75 mounted in the channel produced between the outer portion of the frame or collar 56 and the flange 69, and extending for a distance of about 90° or less each, or one-fourth of the circumference of the frame at diagonally opposite points above and below the axis or center of the reflector and frame, but diametrically opposite each other, to shift therein. This constitutes means for connecting and actuating a plurality of shutters for simultaneous operation in opening and closing, merely by turning one of the shafts or pivots, preferably at the center, the pivots and shutters being preferably horizontally arranged as shown.

The location of the connectors or strips 75 above and below the center causes the plates to be turned in opposite directions for one-quarter of a revolution each, and the central pivot has two oppositely extending arms or crank portions 73 adapted to carry two blades movable in opposite directions, as more particularly indicated by the arrows in Fig. 9, so as to close in overlapping relation and to open outwardly and inwardly as well as to counterbalance one another so that they may be turned with the least expenditure of effort or power. This demountable assembly also facilitates repair, replacement or adjustment.

One of the shutters 67 or connectors 75, preferably the lower one which connects to the central shaft or pivot 68, is preferably offset inwardly at its upper portion to overlie the lower portion of the corresponding upper shutter or connector, and to receive the cranks or arms in its slots, and all the shutters and connectors may be held firmly and in position by suitable means such as springs 75a, disposed in the channel and between its radial wall and the connectors 75, which carry said springs.

In order to actuate the shutters to normally close the same for the purpose of obscuring or obstructing the light rays of the flood light or for opening the same either for an instant for a flash or snapshot or for any desired time interval for time exposures, the following operating means is provided, as indicated generally at 76. This operating means is connected to one of the shafts or pivots 68, preferably at the center of the frame and reflector, and has an actuating means 77 which may somewhat correspond to the control device 23 and the cable 24 directly connected to the camera shutter mechanisms as used in some cameras, and a flexible cable 78 is connected thereto and extends through a flexible tubular casing or sheath 79, the same as the sheath 25, is anchored at its opposite ends in a corresponding manner. The cable 78 extends into the manual plunger control means 26 in the same manner as the cable 24, as shown in Fig. 2 of the drawings, and consequently the construction is identified by the same reference characters, and therefore duplication of the description is omitted. However, it may be mentioned that the ends of the cables 24 and 78 or the rigid rods provided within the cylinder 28 where they project from one end of the cylinder, or the core 31 within the spring 36 and plunger 35, may be of corresponding lengths, spaced apart in stepped relation, or one in advance of or back of the other so as to cause simultaneous or synchronous operation of the cables or successive operation in any desired timed relation or time interval therebetween, determined by the degree of difference between the extension of said ends. Naturally, when the ends are in alignment or extend the same distance, the operation is synchronous and when one end extends beyond the other, the operation is delayed or successive, but the cables are both actuated by the same means 26, by depressing the plunger 35 through the medium of the head or finger-piece 38, to be returned under the tension of the spring 36 automatically on release of the pressure.

The operating means 76 includes a casing 80 having suitable means such as lugs 81 mounted by screws 82 on the reflector, as by means of the frame or collar 56 at one side of the latter. This casing has a tubular extension or cylinder 83 constituting part of the operating means 77 and projecting down from the interior of the casing to anchor the flexible tubular casing or sheath 79 at its end remote from the manual plunger control means 26 and to receive the flexible shaft or cable 78 which, like the cable 24, may be a coil spring. A rod 84 is vertically slidable in the casing and its lower end extends into the cylinder 83, limited by a stop collar 85, capable of adjustment if desired. The lower end of the rod is engaged by the free end of the cable 78 and a spring 86 on the rod 84 between the top of the casing, and a cross-pin 87 or other shoulder on the rod 84, presses down on the latter to hold the rod firmly in a downward position. This rod has a trunnion 88 received in a slot 89 of a bell crank lever 90, which is fixed to one end of the central pivot or shaft 68, so that by pressing the plunger 35 and sliding the cable 78, the rod 84 will be raised to swing the bell crank lever or arm 90 and actuate the shutters 67, which are connected by the connectors or strips 75 for simultaneous operation as previously described. Upon release of the pressure at the finger-engaging piece or head 38, not only will the plunger be returned to its normal position by the camera shutter actuating mechanism or timer at 22 or 23 and spring 36, as described in connection with the cable or flexible shaft 24, but the spring 86 will return the rod 84 to its normal position and push the cable 78 back to its normal position, which will also close the shutters of the camera and flood light. In order to assist in momentarily holding the shutters 22 and 67 in open positions and relieve the pressure on the finger, the other arm 91 of the bell crank lever may frictionally engage a spring catch 92 to hold the rod 84 up and the shutters open, but the quick return of the rod by the spring 86, assisted by the spring 36 upon release of pressure from the fingerpiece or head 38 or timed release and closing of the camera shutter 22 at the timer or timing mechanism of the camera shutter operating device 23, will serve to disengage the arm 91 from the catch 92 to permit the shutters 22 and 67 to close, and thereby obstruct or intercept the light rays from the flood light which would be projected and reflected by the polished interior of the reflector casing 39 when the shutters 67 are open. No material obstruction to the passage of the light rays is caused by the pivots of the shutters 67 or the arms 60. This structure is primarily for manual or automatic control of the opening and closing of the reflector shutters of the flood light for photo-flash or snapshots, and they may be held open for any desired time interval for time exposures, whether the camera is provided with a time controlled shutter-closing mechanism or not, so as to permit instantaneous, time or bulb exposures. The timing may be done by the timer or timing mechanism of the shutter 22 and shutter operating device 23 of the camera 20 by automatic release of the cable 24 or from a watch, clock or stop-watch as, it is thought, will be readily appreciated. This mechanism is shown in Figs. 1 to 13 inclusive on the camera and flood light, and in Figs. 14 to 18, inclusive the flood light is, also, provided with a timer as will now be described.

The operating means 76 may be made automatic in the form of a timer or time-control mechanism in the casing 80, as shown in Figs. 14 to 18 inclusive. In this instance, the operating means 77 or cylinder 83 may be pivoted as at 93 on a lug of the casing adjacent and opening in the bottom thereof, to receive the cylinder 83, to swing the rod 84, and the rod may have a worm thread or rack 94 in its length and a cam surface 95 at its upper end acting against a wall 96. This constitutes part of a timer mechanism, including a worm gear or pinion 97 fixed to the central shaft 68, and the rack is held into engagement with the pinion or gear by a retractile power spring 98 connected to the rod 84 and the casing 80, to hold the rod downwardly in its normal position. The shaft may also have a corresponding arm 91 to engage a spring catch 92, as described in connection with the operating-control means shown more particularly in Figs. 6, 8 and 10 of the drawings. The gear 97 meshes with a pinion 99 fixed to a shaft 100 rotatably mounted in the casing and carrying a cross-arm 101 with a long arm connected to a retractible power spring 102 which, like the spring 98, constitutes power or motive means to actuate the parts to which they are connected, namely, to hold the rod 84 downwardly and the long arm of the cross arm or lever 101 vertical as shown in Fig. 14. The short arm at the top of the cross-arm or lever 101 carries a pivoted detent or cradle 103, and a disk 104 is loose on the shaft 100 and has a recess 105 in its periphery longer than the detent 103, so as to allow a lag in the movement between the parts indicated by a space 106 at either end. The rotation of the disk 104 is controlled by an escapement mechanism 107 of any known type such as provided on watches and clocks, the escapement wheel 108 of which may be geared to the disk 104 and controlled by a ratchet mechanism, which may include a pivoted lever 109 associated with a hair-spring actuated balance wheel 110 constituting part of the escapement mechanism. The lower end of the long arm of the cross-arm 101 may be slotted for slidable connection with a rod 111 pivoted at 112 in the casing, and a spring 113 is mounted between the pivot of the rod and the long end of the arm of the cross arm or lever 101 to move the latter (Fig. 15) over the dead center position. Thus, when pressure is exerted on the cable 78 to raise the rod 84 which expands the motor or power spring 98, the rack 94 will rotate the gear 97 clockwise as shown in Fig. 14 by the arrow, and this will impart anti-clockwise rotation to the pinion 99 and lever 101, moving the latter to the right as shown in Fig. 15, compressing the spring 113, and expanding or stretching the spring 102, which springs 102 and 113 constitute power springs or motors which are wound by this action. Since the detent 103 moves with the lever 101 in the recess 105, such movement will be allowed by the space 106 at one end before engaging the end of the recess or shoulder thus provided, without affecting the escapement mechanism. The detent may comprise oppositely extending spring-held arms independently pivoted on the short arm of the cross arm or lever 101. In this position the arm 91 may engage the catch 92 to momentarily hold the parts in the position described, with the shutters open as caused by the upward movement or translation of the rod 84. During this upward movement a cam surface 114 on the rod 84 will strike a projection 115 on the casing and shift the rod 84 to the left to disengage the rack from the gear 97. The springs 102 and 113 will then act to swing the lever 101 to the left from the position shown in Fig. 15 to the position shown in Fig. 14, especially the spring 102, which is primarily the power spring, while the spring 113 is a light or hair spring serving primarily to centralize the position of the cross arm or lever. As this takes place, the detent at the left will ride through the space 106, which was formerly at the right on the opening movement of the shutters when the lever 101 was swung to the right, and thus there will be a lag or interval of time before the engagement of the detent with the shoulder at the end of the recess 105 at the left, and when this happens, retarded by the escapement mechanism, the gears will slowly turn, and the spring 98 having returned the rack 94 into engagement with the gear, the rod will be lowered slowly, to return the cable 78 to its initial position for another operation. Adjustment of the timing may be effected by an adjustable arm 116 constituting a stop shoulder at one end of the recess 105 to vary the time interval of the closing of the shutters, and this may be done by having the shaft 100 of the pinion 99 and disk 104 split or otherwise formed as indicated at 117 and in the form of a sleeve of tapered formation which may be externally threaded for engagement by a tapered nut 118 to adjust the position of the stop arm 116 on the disk 104 by means of a knurled head 119 coacting with graduations 120 and a suitable mark or arrow 121, so that the timing may be set for any part of a second, minute or several minutes, as desired, for the exposure and taking of a picture in time exposures. Of course, the plunger 35 and operating head or fingerpiece 38 may be held down to hold the shutters 22 and 67 open by the raising of the rod 84 for manual control of the time of exposure, in addition to the automatic timing by the mechanism described, or any equivalent means, the use of which I desire to reserve as comprehended within the scope of the invention, even though a particular form is illustrated and described. In either form of the invention, when the fingerpiece 38 is pressed inwardly or downwardly against the spring 36, the movable contact 53 will bridge the contacts 51 and 52 and close the circuit to the flood-light bulb, and this may be independent of the switch 47 or in conjunction therewith.

Further movement of the plunger 35 will cause engagement thereof with the cables 24 and 78, either simultaneously or successively, and shift the latter in any suitable timed relation. Assuming that the camera shutter and reflector shutters are normally closed, the operation may be effected in the following sequences: To turn on the flood light; to open the camera shutter; to open the flood-light shutters; to close the flood-light shutters; to close the camera shutter and turn off the flood light, or to open the camera shutter and the flood-light shutters simultaneously or successively; and then to turn off the flood light and close the camera and flood-light shutters as the plunger 35 engages the cables 24 and 78 and moves the contact 53 out of engagement with the contact 51 and into position so as not to bridge the two contacts 51 and 52 as shown in Fig. 2 of the drawings. By adjustment of the cables in the cylinder 28, this operation may be varied from a synchronous to a successive operation of the photographing means as embodied in the photographic control means constituting the invention. For instance, if the camera shutter and reflector shutters of the flood light are normally closed, this may be done so as to turn on the flood light, then open the camera shutter and then open the flood-light shutters successively, and in the reverse operation to first close the flood-light shutters and then the camera shutter, or vice versa, and finally, to turn off the flood light. By this means other suitable lighting means may be employed, for posing or obtaining a setting or in focusing the object to be photographed, or since the flood light may only be used when focusing or taking a picture for short intervals at a time, its useful life will thereby be greatly lengthened and economy practiced, so that the cost of producing the picture may be reduced considerably, especially in so far as the exposure of the films or plates is concerned.

Attention is also directed to the fact that the plug 29 may be removed to permit the cables 24 and 78 or rod portions thereof at the cylinder 28 to be drawn partially out to obtain access to the collars 32, whereby they may be adjusted on the cables to vary the relative positions of the ends thereof in alignment or even, or extending one in advance of or beyond the other, that is, out of alignment, for simultaneous or successive engagement, respectively, by the plunger 35, to cause synchronous or simultaneous and successive or delayed movement of the cables and similar operation of the shutters relative to each other, as will, it is thought, be readily and well understood.

It will also be seen that the cost will be less than the cost of using flash-light bulbs and that a photo-flash or snapshot may be obtained with a flood light by controlling the opening and closing of the shutters and the projection and reflection of the intensive light rays of the flood light or lamp by means of the shutters as described, and that the flood light may be used in taking time exposures in the ordinary way or with accurate control of the camera shutter manually or automatically by means of its timer or photographic shutter control means, if so provided, as is obviously optional. However, the present timing device controlling the operation of the shutters permits the use of a camera with or without a shutter timer, and the control means employed as described is not only simple and inexpensive and capable of application to reflectors of various types and sizes, but so simple as to be easily operated by anyone desiring to make photo-flash or snapshots or time pictures in the dark or at night time. The mechanism is simple, inexpensive and positive in operation, so as to obtain the best results possible in photographing objects with artificial light.

While I have illustrated and described the preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The combination with a camera of a shutter mechanism adapted to be cable-operated, a reflector having a lighting source and adapted to produce a flood light of considerable intensity, shutters over the front of the reflector and cable-operated means for the camera shutter and the reflector shutters, said means being adapted to operate said shutters in timed relation synchronously or in succession, and to light or extinguish the lighting source in timed relation to the operation of the shutters.

2. The combination with a camera of a shutter mechanism adapted to be cable-operated, a reflector having a lighting source and adapted to produce a flood light of considerable intensity, shutters over the front of the reflector and cable-operated means for the camera shutter and the reflector shutters, said means being adapted to operate said shutters in timed relation synchronously or in succession, and to light or extinguish the lighting source in timed relation to the operation of the shutters, said means being operable from a distant point by a single operating means to regulate the time of closing of the reflector shutters automatically.

3. In combination, a camera having a shutter, a shutter-actuating means, means for operating said shutter-actuating means, a floodlight reflector having a flood light, and light obscuring and passing means at the front thereof and operated with the operation of the camera-shutter actuating means to turn on the flood light or extinguish the same, and to open and close the light obscuring and passing means in timed relation to the operation of the camera shutter and flood-light control means.

4. In combination with a reflector, of means on the reflector to obscure light rays from a lamp therein, or to permit projection thereof for any time interval desired, means for opening said obscuring means, means for automatically closing said obscuring means and a timer associated with said closing means for controlling said time interval between opening and closing of the obscuring means.

5. In combination with a floodlight reflector, having lighting means therein, of shutters over the open side of the reflector, means to open said shutters, and means including a timer to automatically close the shutters instantaneously or after any desired time interval.

6. The combination with a floodlight reflector, and shutters mounted over the reflector and normally closed to obstruct the projection and reflection of light rays therefrom and adapted to be opened to permit such light rays to pass, of cable-operated means to manually open said shutters, and means including an adjustable timing device to automatically close the shutters after an instant or cause delayed closing thereof after a suitable interval of time, said timing device adapted to control the interval of time between opening and closing of the shutters.

7. In combination with a floodlight reflector having a floodlight bulb, of shutters mounted on the reflector to be opened and closed, means for manually opening the shutters and lighting the bulb, means associated with the first means for automatically closing the shutters and extinguishing the bulb, and means adapted to be preset to control the closing of the shutters after a predetermined time interval, and including a timer for adjusting the time interval between the opening and closing of the shutters.

8. In combination with a camera having an exposure shutter, actuating means therefor to connect a cable, a floodlight reflector, a frame mounted on the rim of the reflector, shutters on the frame, means to open the shutters, including a casing, cables movably mounted in the casing, means to adjust the relative projection of the cable ends within the casing, a plunger movable in the casing to engage and move the cables, said plunger being normally held away from the cable ends, said cables being operatively connected at their opposite ends to the camera shutter and the reflector shutters, means on the frame and connected to a cable to automatically close the shutters of the reflector to obscure the light rays from the lamp of the reflector, or to permit projection thereof, and pre-settable means to control the time of exposure and closing of the shutters.

9. In combination with a camera having an exposure shutter, actuating means therefor to connect a cable, a flood-light reflector, a frame mounted on the rim of the reflector, shutters on the frame, means to open the shutters, including a casing, cables movably mounted in the casing, means to adjust the relative projection of the cable ends within the casing, a plunger movable in the casing to engage and move the cables, said plunger being normally held away from the cable ends, said cables being operatively connected at their opposite ends to the camera shutter and the reflector shutters, means on the frame and connected to a cable to automatically close the shutters of the reflector to obscure the light rays from the lamp of the reflector, or to permit projection thereof, presettable means to control the time of exposure during which the shutters are open and closing of the shutters, a contact carried by the plunger, and spaced contacts carried by the casing in circuit with the lamp and engaged by the plunger contact to close the circuit to the lamp upon opening the shutters and movable to open said circuit when the shutters are closed.

10. In combination, a camera, a shutter mechanism therefor, a shutter operating device including a timer controlling the closing of the shutters, a plunger control means comprising a cylinder, a plunger movable in the cylinder, and held in one direction, cables having ends movable in the cylinder and engageable by the cylinder, one cable being connected to the shutter operating device, a floodlight lamp having a reflector, shutters on the front of the reflector to obstruct the light rays from the lamp, or permit the same to pass, and movable to open and closed positions, a contact movable with the plunger, stationary contacts in the cylinder, engageable by the movable contact, an electrical circuit including the contacts and lamp, and control means for the shutters operatively connected to the cables, said cables being adjustable for engagement by the plunger simultaneously or successively to open or close the shutters in similar relation, and an adjustable timer on the control means for the shutters to regulate the time interval between opening and closing of the shutters, said control means adapted to move the cables to close the shutters and then open the circuit to the lamp.

11. A light control means for reflectors, including a frame adapted to fit the open edge of the reflector, shutter means for closing or opening the reflector, means for automatically actuating the shutter means to close the reflector, and timing means for regulating said automatic closing actuation.

12. In combination with a camera having an exposure shutter adapted to be opened and closed, a floodlight reflector having a rim, a frame mounted on the rim, shutters on the frame adapted to be opened and closed, means for synchronously or successively opening all of the shutters, means for automatically closing the shutters on the frame in timed relation to the opening and closing of the camera shutter, and for lighting, and automatically and subsequently extinguishing the lamp, and means for varying the time between opening and closing of the shutters.

13. A photographic control means comprising in combination, a camera having a shutter mechanism, a floodlight having a reflector, means on the reflector to obscure light rays from the floodlight therein, or to permit projection thereof, means to open the camera shutter and said obscuring means, means to automatically close said camera shutter and obscuring means after a time interval, and means associated with the closing means for adjusting said time intervals.

WENDEL M. SCHNEIDER.